US012572739B2

(12) United States Patent
Beamon et al.

(10) Patent No.: US 12,572,739 B2
(45) Date of Patent: Mar. 10, 2026

(54) GENERATING MACHINE INTERPRETABLE DECOMPOSABLE MODELS FROM REQUIREMENTS TEXT

(71) Applicant: Raytheon Company, Arlington, VA (US)

(72) Inventors: Bridget B. Beamon, McKinney, TX (US); Hector L. Irizarry, Rowlett, TX (US)

(73) Assignee: Raytheon Company, Arlington, VA (US)

( * ) Notice: Subject to any disclaimer, the term of this patent is extended or adjusted under 35 U.S.C. 154(b) by 465 days.

(21) Appl. No.: 17/957,934

(22) Filed: Sep. 30, 2022

(65) Prior Publication Data

US 2024/0111952 A1     Apr. 4, 2024

(51) Int. Cl.
*G06F 40/20* (2020.01)
*G06F 40/211* (2020.01)
(Continued)

(52) U.S. Cl.
CPC .......... *G06F 40/279* (2020.01); *G06F 40/211* (2020.01); *G06F 40/226* (2020.01);
(Continued)

(58) Field of Classification Search
None
See application file for complete search history.

(56) References Cited

U.S. PATENT DOCUMENTS 8,561,014 B2 * 10/2013 Mengusoglu ......... G06F 40/205
717/136
9,342,489 B2 * 5/2016 Sethu .................... G06F 40/289
(Continued)

FOREIGN PATENT DOCUMENTS

CN       113190222 A    7/2021
JP       5536518 B2     5/2014

OTHER PUBLICATIONS

Ahmed, Mudassar Adeel, et al., "A Novel Natural Language Processing (NLP) Approach to Automatically Generate Conceptual Class Model from Initial Software Requirements", Information Science and Applications 2017. ICISA 2017. Lecture Notes in Electrical Engineering, vol. 424, (Mar. 18, 2017), 476-484.
(Continued)

*Primary Examiner* — Richard Z Zhu
(74) *Attorney, Agent, or Firm* — Schwegman Lundberg & Woessner, P.A.

(57)          ABSTRACT

Embodiments regard generating a requirements statement model. A method can include extracting, from a requirements document, a requirement statement, tagging each word of the requirements statement with a corresponding part of speech tag, identifying dependencies between words and types of dependencies between each word of the requirements statement and associating types of dependencies with each word, generating respective meta-tags for each word of the requirements statement based on the part of speech tag and dependencies, each meta-tag including the parts of speech and type of dependency for each word, identifying, based on the meta-tags and the dependencies, a tree of trees that represent the structure of the requirements statement, and populating the requirements statement model that maps to the identified tree with words of the requirements statement.

20 Claims, 6 Drawing Sheets

(51) Int. Cl.

| | |
|---|---|
| *G06F 40/226* | (2020.01) |
| *G06F 40/279* | (2020.01) |
| *G06F 40/295* | (2020.01) |
| *G06F 40/30* | (2020.01) |
| G06F 40/205 | (2020.01) |
| G06F 40/216 | (2020.01) |
| G06F 40/237 | (2020.01) |
| G06F 40/253 | (2020.01) |
| G06F 40/284 | (2020.01) |
| G06F 40/289 | (2020.01) |

(52) U.S. Cl.

CPC ............ *G06F 40/295* (2020.01); *G06F 40/30* (2020.01); *G06F 40/205* (2020.01); *G06F 40/216* (2020.01); *G06F 40/237* (2020.01); *G06F 40/253* (2020.01); *G06F 40/284* (2020.01); *G06F 40/289* (2020.01)

(56) References Cited

U.S. PATENT DOCUMENTS

| | | | |
|---|---|---|---|
| 10,650,089 B1 * | 5/2020 | Walker .................. | G06F 40/211 |
| 10,776,704 B2 * | 9/2020 | Chaudhuri ............... | G06N 5/00 |
| 11,023,625 B2 | 6/2021 | Eck et al. | |
| 11,295,082 B2 * | 4/2022 | Li ......................... | G06F 40/289 |
| 11,748,577 B1 * | 9/2023 | Aberle ................... | G06N 20/00 704/9 |
| 2009/0093901 A1 * | 4/2009 | Awile ..................... | G06F 30/00 700/97 |
| 2015/0286618 A1 * | 10/2015 | Walker .................. | G06F 40/253 704/9 |
| 2017/0147413 A1 * | 5/2017 | Grebnov ................. | G06F 9/528 |
| 2020/0364343 A1 * | 11/2020 | Atighetchi .............. | G06F 8/427 |
| 2023/0297774 A1 * | 9/2023 | Chen ...................... | G06F 8/10 704/9 |
| 2024/0046047 A1 * | 2/2024 | Rajbhoj ................ | G06F 40/295 |

OTHER PUBLICATIONS

Arellano, Andres, et al., "Natural Language Processing of Textual Requirements", Icons 2015: The Tenth International Conference on Systems, (2015), 93-97.

Ballard, Marlin, et al., "Bidirectional Text-to-Model Element Requirement Transformation", 2020 IEEE Aerospace Conference, (2020), 14 pgs.

Hamdani, Maryum, et al., "A Novel Framework to Automatically Generate IFML Models From Plain Text Requirements", IEEE Access, vol. 7, (2019), 183489-183513.

Kravari, Kalliopi, et al., "Sense: A Flow-Down Semantics-Based Requirements Engineering Framework", Algorithms vol. 14, (2021), 19 pgs.

* cited by examiner

200

500

550 — PREPROCESS

552 — EXTRACT PRECONDITION

554 — NLP PIPELINE

556 — EXTRACT ROOT AND IMPERATIVE

558 — EXTRACT SUBJECT OF ROOT

560 — EXTRACT OBJECT OF ROOT WITH CONSTRAINTS

562 — RECONCILE ENTITIES

564 — VALIDATE MODEL

GENERATING MACHINE INTERPRETABLE DECOMPOSABLE MODELS FROM REQUIREMENTS TEXT

TECHNICAL FIELD

Embodiments discussed herein regard devices, systems, and methods for generating a machine interpretable model from requirements text.

BACKGROUND

Requirements texts define a scope of a project. The project can be designing a component, performing an operation, or the like. The requirements text describes the results to be achieved by the project. Requirements texts are hard to understand and can have ambiguities, inconsistencies, are unverifiable, or other issues that make it difficult to ascertain the exact scope of the project. Requirements texts are very time-consuming to analyze by hand and there is currently no known techniques for fully automating requirements text analysis.

DETAILED DESCRIPTION

Figure 1:
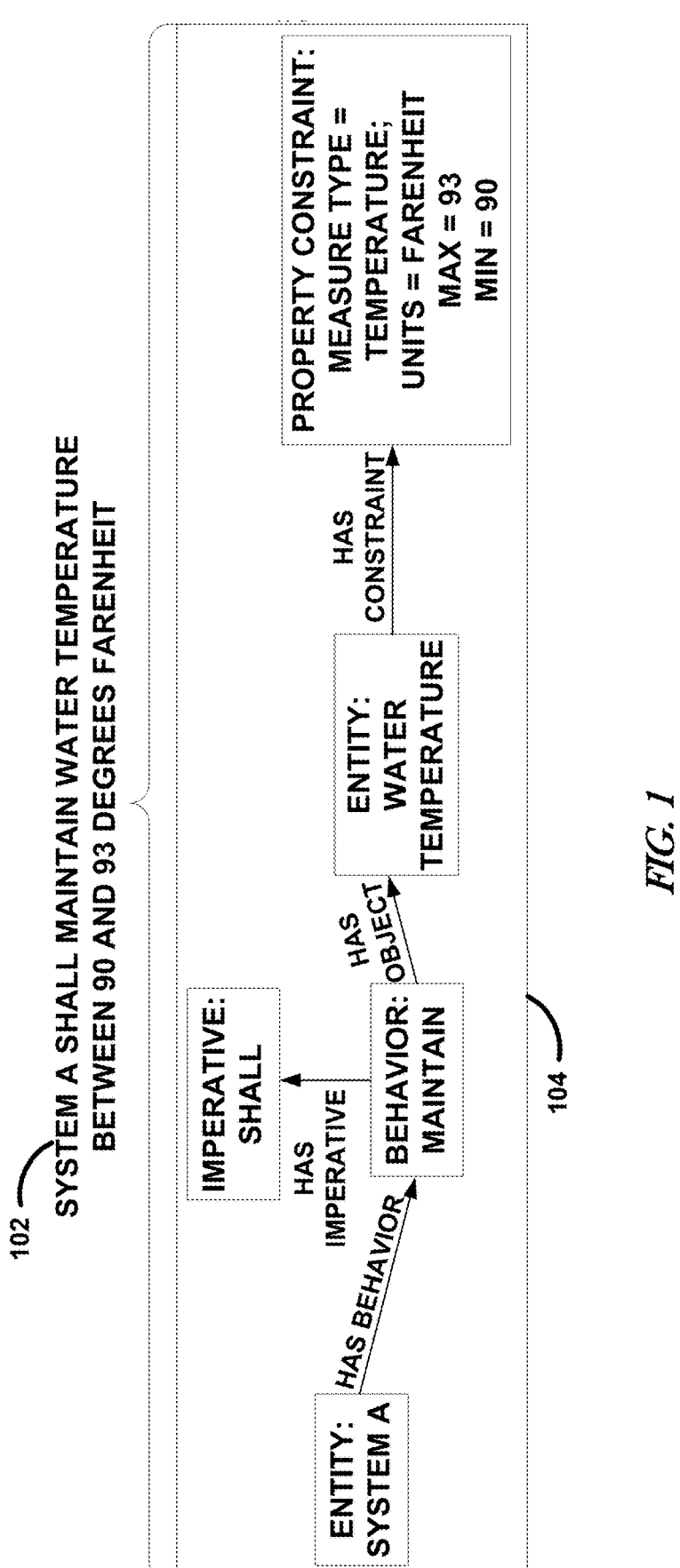
FIG. 1 illustrates, by way of example, a diagram of an embodiment of generating a meta-model based on a requirements document statement.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Requirements documents have a long history in product and service development. They are ubiquitous and relatively fast to write and generally understandable when written well. However, it is very challenging to write a narrow, unambiguous, and verifiable requirements document. Human analysis of a requirements document is very time-consuming and expensive.

Computer-based models that analyze requirements documents are visually intuitive with natural clustering of related components in the requirements document. The computer-based models provide a visual and programmatic representation of system structure and a decomposition representation. Using computer-based models, structural validation is possible and effects of a change requirement change can be easily identified. However, the machine-compatible requirements documents are harder to generate as they need to be unambiguous, there are competing formats, and there is a learning curve for generating statements that are understandable by the computer, among other issues. Embodiments help bridge the gap between generally acceptable requirements documents and requirements documents that are compatible with computer model compatible requirements documents.

Currently, natural language is used to express system requirements. Natural language in general is broad and ambiguous; full of polysemous words and expressions. Clear written communication that conveys the same semantics between parties can be difficult. This is especially true of complex system specifications. Reviewing, analyzing, and updating requirements for consensus between stakeholders is very time consuming and expensive. Additionally, textualized requirements lack specification for automation or contract validation. Models can be shared without ambiguity and validated using automated processes; with a proven track record of reducing errors and overall program cost. Mass adoption of model-based requirements is hindered by steep learning curve, the time and cost of developing model-based system engineering (MBSE) expertise and competing model formats with no clear leading system modeling standard.

Embodiments provide a tool to bridge the gap between text requirements and model-based requirements. Embodiments reduce the complexity of creating models from text or summarizing complex models into clear text. With embodiments, plain text can be translated to machine interpretable model(s) like SYSML using patterns of natural language processing (NLP) (e.g., parts of speech (POS) and dependency (DEP) tagging). Relationships between requirements can be extracted from the text and represented with graphical relationships. Entities, behaviors, attributes, and constraints can be identified and validated against domain ontologies and customizable rules. Such a mechanism assists the user with initial model creation from text.

Resulting model supports requirements decomposition and can be validated for structural issues as:

Completeness—possible missing requirements

Invalid relationships and entities

Semantic Inconsistencies

FIG. 1 illustrates, by way of example, a diagram of an embodiment of generating a meta-model 104 based on a requirements document statement 102. The meta-model 104 can be input into a computer analysis program to analyze for vagueness, ambiguities, inconsistencies, or the like, which are not desirable in a requirement document. The meta-model retains all textual semantics so then it can be exported to any architectural language such as SysML (System Modeling Language). SysML is currently the most widely used system model language.

The document statement 102 is a sentence from the requirements document. The document statement 102 includes an imperative (e.g., "shall", "must", "necessary", or the like). The document statement 102 is typically a single sentence. The meta-model 104 is a visual representation of the words of the sentence and dependencies between the words. The meta-model 104 simplifies the sentence into an actor (who/what must perform the requirement), a behavior (e.g., a verb), an object (who/what is being acted upon), and constraints to be placed on the object by the actor. The view of the sentence in this form is much simpler than the sentence. The sentence has twelve (12) words in this example and the meta-model only has five components, thus simplifying the complexity of the relationships between the actor and object.

To generate the meta-model, embodiments can leverage aspects of NLP, including parts of speech (POS), sentence dependency (DEP), named entity recognition (NER), noun phrases (NP), regular expressions (REG EX), or other language processing technique, or a combination thereof. User recognized sentence types can be represented as a pattern of NLP objects that support automated parsing of requirement sentences into a meta-model. Embodiments can leverage an insight that there are a finite number of requirement statement forms. Since there are a finite number of requirement statement forms, a complete library of 'NLP patterns' representing statement forms can be generated. These patterns are specific to the recognized forms of requirement statements and are a custom application of NLP. Using this library of patterns, each sentence can then be automatically mapped, via the language processing techniques, to an NLP tagged tree. Analysis on the structure of the tree with its identified tags can be used to build a meta-model. Analysis involves leveraging the root word, inferring the role of requirement sentence words by their NLP tags and co-existence with other tags, combining compound expressions and other custom logic. The resulting meta-model is a semantically equivalent graphical model-based form of the original text.

Examples of requirement statement forms include:

Nominal requirement: <subject><imperative><verb> <object>

Event-driven requirement: When <condition clause>, the <subject clause> shall <action verb clause><object clause><optional qualifying clause>

Event-driven requirement: In the event of <specific event> the <system name> shall <system response>

Behavior-driven requirement: If <optional preconditions/trigger>, then the <system name> shall <system response>

State-driven requirement: While <state> the <system name> shall <system response>

Figure 2:
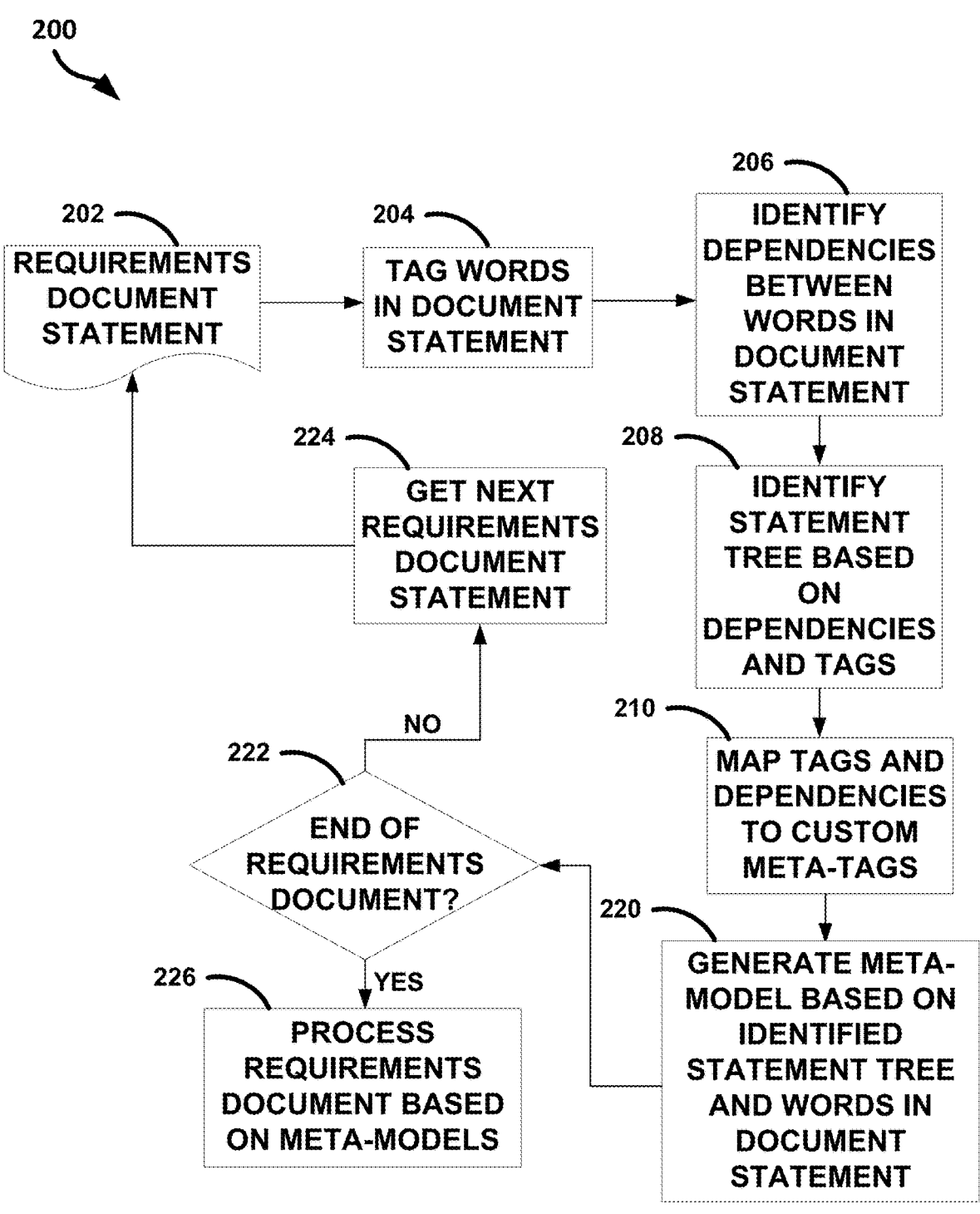
FIG. 2 illustrates, by way of example, a diagram of an embodiment of a method for generating meta-models for requirements document statements.

FIG. 2 illustrates, by way of example, a diagram of an embodiment of a method 200 for generating meta-models for requirements document statements. A requirements document statement 202 is extracted. Words of the requirements document statement 202 are tagged at operation 204. These initial tags mark aspects of NLP as both coarse and fined grained POS (part of speech), sentence/word relationships DEP (dependencies), NER (Name Entities) etc. Example NLP tags include: VERB_VBZ_ROOT, SCONJ_WRB_advmod, NOUN_NN_nsubj, NOUN_NN_dobj, NOUN_NN_compound, NUM_CD_nummod. The words imply their part of speech, plurality, and role in sentence with relation to other words (i.e. whether the word is a root of the statement, a verb, an object, noun, preposition, constraint, number, measurement, compound, state, precondition, complex conjugate, direct object, object of a preposition, noun subject, number modifier, a combination thereof, or the like. There are varying degrees of the types that color the semantics of sentence. These are just examples of a taxonomy of NLP tags commonly understood and supported by a number or programming libraries.

At operation 206, dependencies between words (note a number is considered a word herein as it includes a symbolic representation that can be expressed by a word) in the requirements document statement 202 are identified. The DEP between words provides the relationships between the words and ultimately defines a tree structure for the statement. Analysis of a large volume of requirements documents statements has shown that there only a finite number of tree forms of the requirements documents statements. These forms are captured into a library of stored NLP patterns supporting automatic matching and NLP tree generation from requirement text.

The tree structure of the requirements document statement is identified at operation 208. The tree structure is generated by an NLP library. However, the parsing and understanding of the tree is by a custom computer algorithm that matches the tree to one of the curated library of NLP patterns. These patterns are pre-populated based on analysis of requirements sentence forms. At operation 210, the standard NLP tags are analyzed and further mapped to custom meta-tags. Meta-tag creation involves combining compound expressions and inferring the role of requirement sentence words by their own NLP tags and co-existence with other tags. Example meta-tags include WHILE_PRECONDITION, WHEN_PRECONDITION, SUBJECT_NOUN, SUBJECT_CONSTRAINT_STATE, VERB_ROOT, OBJECT_NOUN, AGENT_ADP, IMPERATIVE, OBJECT_ADP, NUMERIC_CONSTRAINT_1, NUMERIC_CONSTRAINT_2, MEASURE_TYPE_UNIT, MEASURE_TYPE_UNIT_2. The meta-tag meaning, and corresponding mapping holds true for any requirement. The meta-tags are used to directly create a meta-model. The resulting meta-model is a semantically equivalent graphical model-based form of the original requirement.

Figure 3:
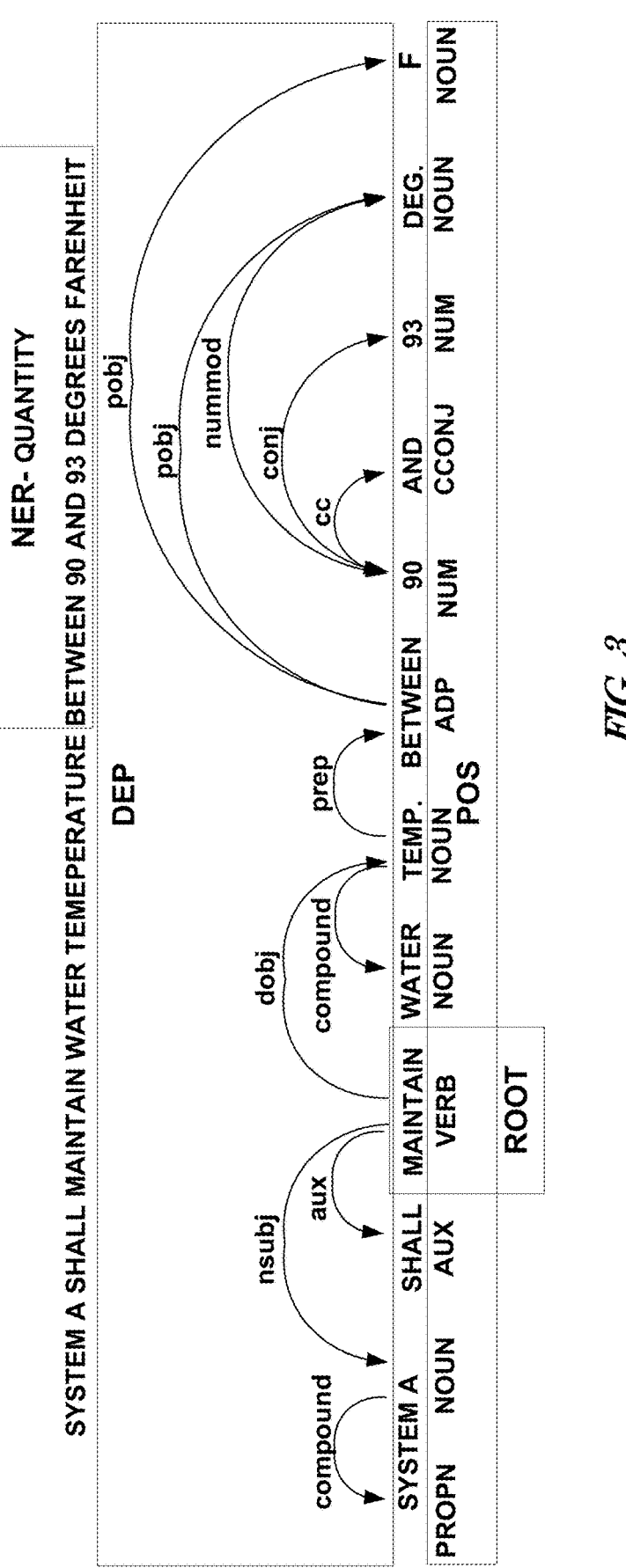
FIG. 3 illustrates, by way of example, an embodiment of some of the operations from FIG. 2.

An example of operations 204, 206, 208, and 210 is provided in FIG. 3. In the example of FIG. 3, a requirements statement "System A shall maintain water temperature between 90 and 93 degrees Fahrenheit" is analyzed in accord with embodiments.

In the example of FIG. 3 A curated library of NLP patterns using well known NLP tags categories (e.g., POS, NER, and DEP) is used to auto generate a tree of NLP tags. Analysis is performed on the resulting tree to determine intermediate meta-tags and finally a meta-model for the words of the requirements statement. NER identifies "between 90 and 93 degrees Fahrenheit" as a quantity. ROOT identifies "maintain" as the root of the requirements statement. Note how, in the tree generated by DEP, "maintain" has no arrows pointing to it, this indicates that "maintain" is the root of the requirements statement as it does not depend on other words of the requirements statement. DEP identifies dependencies between words and the types of the dependencies (e.g., whether the dependency is a compound, noun subject, auxiliary, direct object, preposition, object of preposition, number modifier, conjugate, complex conjugate, among others. POS identifies the part of speech for each word in the requirements statement (e.g., root, proper noun, noun, auxiliary, verb, adposition, number, complex conjugate, or the like). Two or more of these dependencies, parts of speech, root, and named entities can be combined into a meta-tag for a given word of the requirements statement (at operation 204). The tree structure generated by DEP (at operation 206) can be labelled with the tags to identify the tree structure of the requirements statement (at operation 208).

In the example of FIG. 3, the meta-tags can be as follows (word[meta-tag]):

maintain[verb_root]; shall[imperative]; system_A[subject_noun]; water temperature[object_noun]; between [object_ADP]; degrees[measure_type_unit]; 90[numeric_constraint_1]; 93[numeric_constraint_2]; and Fahrenheit[measure_type_unit_2]. Note the meta-model (identified at operation 220) of this requirement statement is illustrated in FIG. 1.

At operation 220, the identified tree structure and meta-tags can be mapped to a meta-model. At operation 220, Meta-tag creation involves analysis of NLP that includes: taking advantage of tree ROOT to walk the tree, inferring the role of requirement sentence words by their own NLP tags and co-existence with other tags, combining compound expressions, and other custom logic. As a result of this analysis, each meta-tag is associated with a word or group of words from the original requirement sentence. Meta-tags are reused across requirements as each meta-tag meaning, and corresponding mapping holds true for any requirement. The meta-tags are used to directly create a meta-model. An example meta-model populated with the words of the example requirement statement is provided in FIG. 1. The meta-model can easily be translated to other system architectural models like SysML.

At operation 222, it is determined whether there are more requirements statements in the requirements document to analyze. If there are more requirements statements (the last requirements statement is not the end of the requirements document) a next requirements document statement can be retrieved at operation 224. Then the operations 204, 206, 208, and 220 can be performed on the next requirements statement retrieved at operation 224. If there are no more requirements statements in the requirements document to analyze (the last requirements statement is the end of the requirements document) the requirements document can be processed based on the meta-models of the requirements statements, at operation 226. The meta-models can be provided to existing analysis tools to determine whether the requirements statements are consistent, vague, ambiguous, or the like. For example, one analysis tool can receive the meta-models and provide a graphical view of dependencies and the nature of the dependencies between entities of a system. A system designer can view the graphical view of the dependencies and the nature of the dependencies to determine whether the system is designed correctly, whether the requirements statements are correct, or the like.

The tree view in the example of FIG. 2 displays resulting coarse and fined grained POS and DEP tags that occur using standard NLP libraries. These tags are well understood parts of English language. As part of our NLP processing, embodiments use these tags to further map words to custom meta-tags. Note that embodiments consider that nouns, verbs, unit or any element maybe compound. The meta-tag is then associated with the complete verb or noun (for example "water temperature", "degrees Fahrenheit" is also compound but were purposefully kept separate to support validation and enforcement of unit terminology consistency).

An explanation of each of the custom meta tags in the example of FIG. 3 is provided:

VERB_ROOT—with a few precondition clause exceptions, well-formed requirement statements contain a pivotal root element which is a verb.

IMPERATIVE—except for the precondition clause, all well-formed requirement statement verbs are preceded by an imperative.

SUBJECT_NOUN—subject entity of a requirement sentence

OBJECT_NOUN—object entity of a requirement sentence

OBJECT_ADP—covers prepositions and post positions associated with a requirement object. Most often when combined with numeric constraints, it establishes the "how" of a constraint i.e. ('between', 'equal to', 'greater than', 'less than', 'up to').

MEASURE_TYPE_UNIT, MEASURE_TYPE_UNIT_2—it can be important to capture units associated with categories of measurement. Good requirement writing recommends consistency of units in a single requirements document. Correct use of units is essential in material calculation, verification, and validation of delivered product. Requirements have had notable failures when this is not the case. Categories of measures with units often associated with them are provided:

LENGTH": ["m", "meter", "meters", "mm", "millimeter", "millimeters", "cm", "centimeter", "centimeters", "dm", "decimeter", "decimeters", "dam", "dekameter", "dekameters", "km", "kilometer", "kilometers", "hm", "hectometer", "hectometers", "mile", "miles"], "TIME" ["s", "sec", "second", "seconds", "m", "min", "minute", "minutes", "h", "hr", "hrs", "hour", "hours", "day", "days"], "SUBSTANCE": ["mol", "mole", "moles"], "FREQUENCY": ["V", "volt", "volts", "ohm", "dB", "dBc", "decibel", "P", "power", "Hz", "Hertz", "GHz", "gigahertz", "MHz", "megahertz", "KHz", "kilohertz"], "TEMPERATURE": ["F", "Fahrenheit", "C", "Celsius", "K", "Kelvin"], "LUMINOUS_INTENSITY": ["cd", "candela"], "MASS": ["g", "gram", "grams". "cg", "centigram", "centigrams", "mg", "milligram", "milligrams", "dg", "decigram", "decigrams", "dag", "dekagram", "dekagrams", "hg", "hectogram", "hectograms", "kg", "kilogram", "kilograms", "Mg", "megagram", "megagrams", "t", "ton", "tons"], and "POWER": ["j", "joule", "joules", "w", "watts", "J", "Joules", "Joule", "W", "WATTS", "dBm", "decibel-milliwatts"].

NUMERIC_CONSTRAINT_1, NUMERIC_CONSTRAINT_2—used whenever a numeric range is mentioned in a sentence. Only NUMERIC_CONSTRAINT_1 is used whenever a requirement value is to be equal to, less or greater than.

Embodiments leverage a derived library of meta-tags that are used to automatically create the meta-model. This comprehensive set of extensible tags have been crafted by exploring hundreds of requirements statements. The meta models to which the requirements match are semantically complete enough to be exported to any architecture language, preserving the semantics of the original text.

It is important to recognize that ideas can be represented a number of ways in a number of diagrams in architectural languages. Codifying this procedure is beyond the scope of this disclosure as is it best left to the conventions established by Systems Engineers on specific programs. However, the meta-model is intended to be used to seed the model base engineering efforts with entities and diagrams that can be refined by the needs of the analysis program. The simple example that provided in FIG. 3, can be illustrated with a couple SysML behavioral entities and diagrams. These behavioral entities and diagrams are typically interchanged between software programs using JavaScript Object Notation (JSON) or extensible markup extensible markup language (XML)/XML metadata interchange (XMI).

Figure 4:
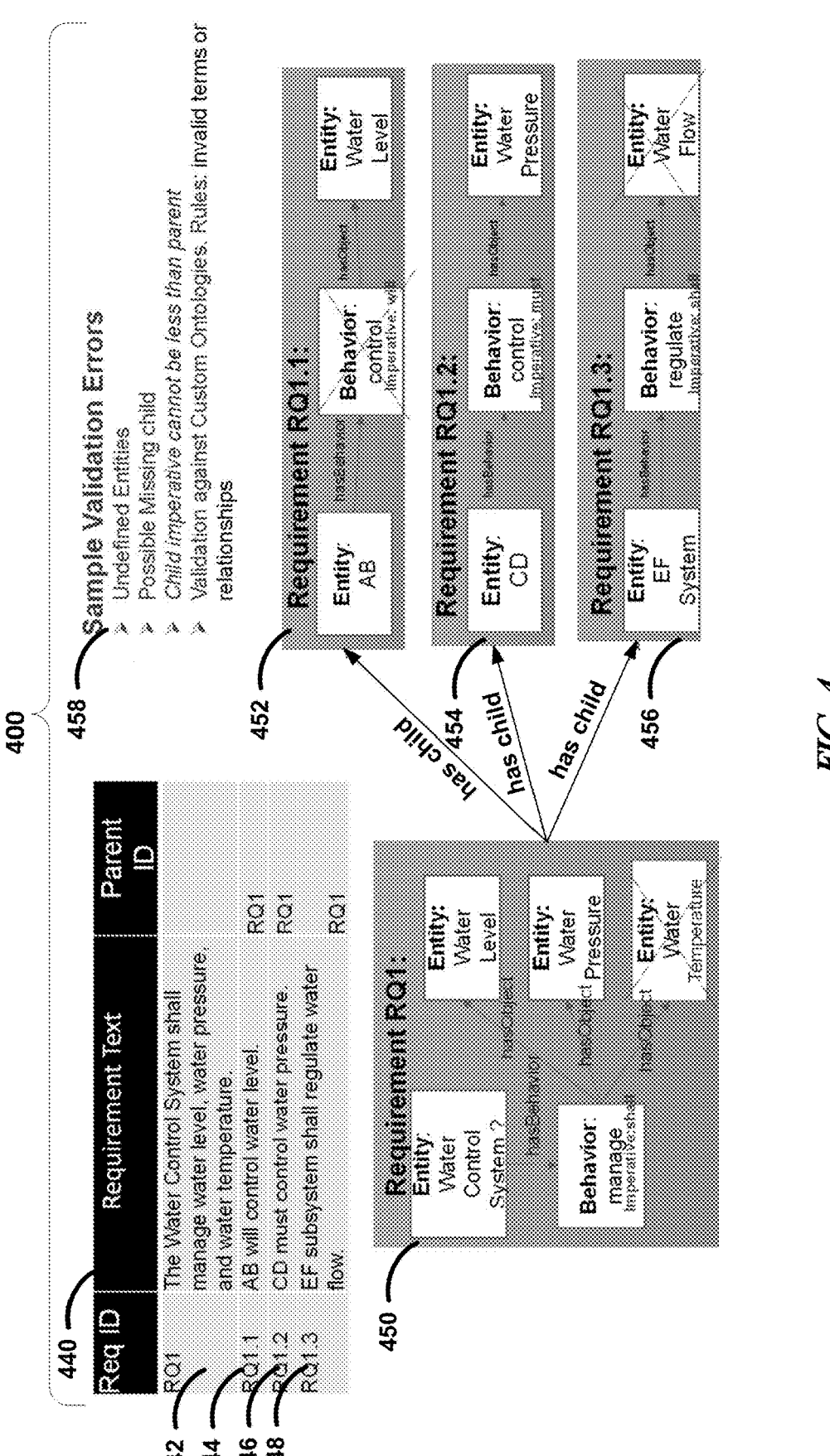
FIG. 4 illustrates, by way of example, a block diagram of an embodiment of a method of identifying errors in an example requirements document.

FIG. 4 illustrates, by way of example, a block diagram of an embodiment of a method 400 of identifying errors 450 in an example requirements document 440. The method 400 is a specific instance of implementing the method 200 on a requirements document. The requirements document 440 includes multiple, interrelated requirements statements 442, 444, 446, and 448. Each of the requirements statements has a corresponding identified meta-model 450, 452, 454, and 456, respectively. The meta-model can be identified using the method 200. The inter-relationships between the meta-models can be identified by an existing analysis tool to identify the dependencies between the meta-models 450, 452, 454, 456. The analysis tool can identify that no entity has been defined to manage an object. In the example of FIG. 4, no entity has been identified to manage water temperature. The analysis tool can identify that a requirements statement does not have a proper imperative. In the example of FIG. 4, "will" is not a proper imperative for a child requirements statement because it is not as strong as the parent imperative of "shall". The analysis tool can identify an undefined entity. In the Example of FIG. 4, "water flow" is an entity that is not defined in the parent meta-model. The analysis tool can identify other such errors and these are just examples of uses of the meta-models.

Figure 5:
FIG. 5 illustrates, by way of example, an embodiment of a more detailed method for meta-model generation.
Figure 5:
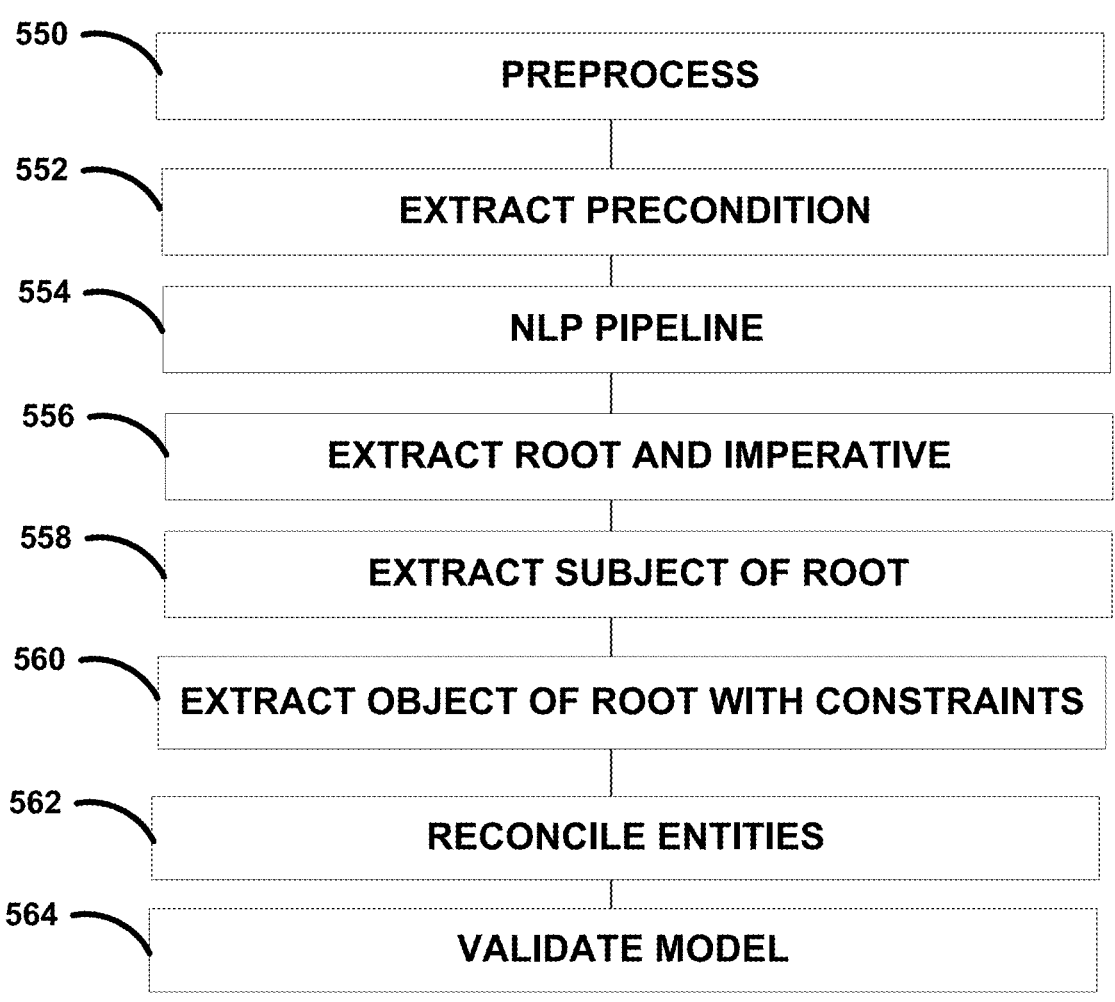

FIG. 5 illustrates, by way of example, an embodiment of a more detailed method 500 for meta-model generation. The method 500 as illustrated includes preprocessing the requirements statement, at operation 550; extracting a preposition from the requirements statement, at operation 552; executing an NLP pipeline (e.g., POS, DEP, REG EX, ROOT, etc.) on the preprocessed requirements statement, at operation 554; extracting the root and imperative from the requirements statement, at operation 556; extracting a subject of the root, at operation 558, extracting an object of the root with constraints (if there are any constraints), at operation 560; reconciling entities, at operation 562; and validating the model, at operation 564.

The operation 550 can include making everything in the requirements document lower case, breaking the requirements document into individual sentences, or the like. The operation 552 is optional as not all requirements statements include a precondition. Example preconditions include "when", "in the event of", "if", "while", etc. The operation 554 can include tokenization, tagging, NER, or the other POS analysis. The operation 556 can include performing DEP and identifying which word has no arrows pointing thereto. This indicates that all words depend on that word, thus that word is the root. The operation 558 can include identifying the word that is the root (often labelled as "nsubj").

The operation 560 includes identifying words that are directly affected by the root word. These words are often tagged as direct object (dobj) or object of preposition (pobj). The operation 560 can include identifying numerical ranges (constraints) associated with the words affected by the root. The operation 562 can include identifying entities (e.g., nouns, objects, or the like) that are similar and merging them into one entity or retaining them as separate entities. The operation 562 helps keep the requirements statement consistent with a given ontology. The operation 564 can include combining the meta-models to form a system model based on relationships between entities in the requirements statements of the requirements document. The operation 564 can include using existing tools to remove duplicate requirements, ensure that consistent imperatives and units are used, detect invalid relationships, identify whether the requirements document is complete (ensure there is an entity defined to implement each and every requirement), or the like.

Embodiments bridge the gap of codifying understanding of system requirements into a structured model using a combination of domain technology: requirements engineering, system modeling, and natural language processing. Specific patterns that are identified are universally useful for modeling functional text requirements written in generally acceptable form. Most prior work has focused on translating requirement models into system models. We focus on translating natural language text requirements into system models. There is limited research attempting to solve this problem. Most of the work in requirements modeling has been abandoned due to the complexity of understanding the requirement format. In this context, requirements modeling differs from the current model-based system engineering (MBSE) use of the phrase which refers maintaining textual requirements, relationships with other entities within the model. Requirements Management in MBSE vs Requirements Management Framework Modeling.

Figure 6:
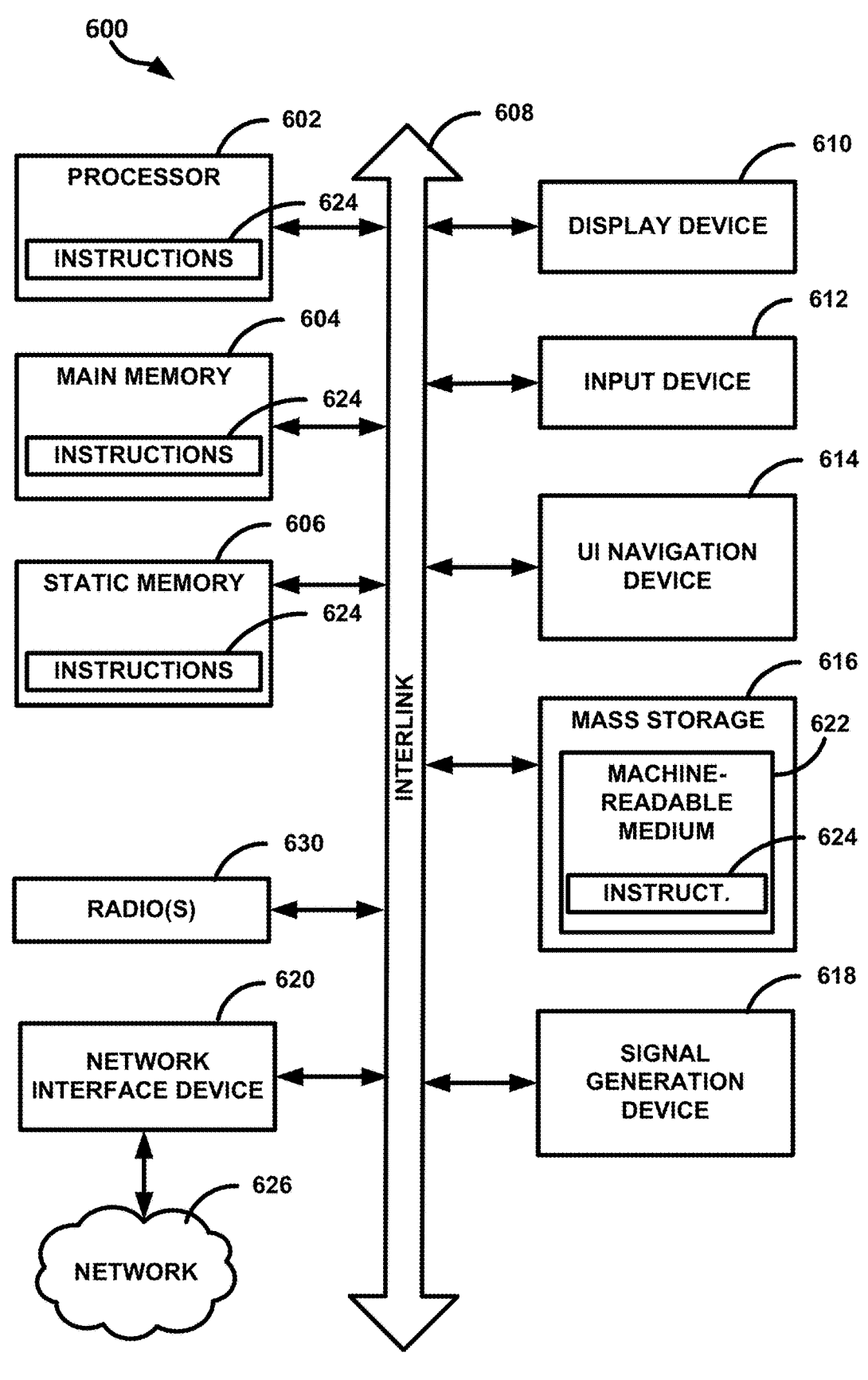
FIG. 6 illustrates, by way of example, a block diagram of an embodiment of a machine in the example form of a computer system within which instructions, for causing the machine to perform any one or more of the methods discussed herein, may be executed.

FIG. 6 illustrates, by way of example, a block diagram of an embodiment of a machine in the example form of a computer system 600 within which instructions, for causing the machine to perform any one or more of the methods discussed herein, may be executed. One or more of the method 200, 500, or other device, component, operation, or method discussed can include, or be implemented or performed by one or more of the components of the computer system 600. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 1414 (e.g., a mouse), a mass storage unit 616, a signal generation device 1418 (e.g., a speaker), a network interface device 620, and a radio 630 such as Bluetooth, WWAN, WLAN, and NFC, permitting the application of security controls on such protocols.

The mass storage unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks: and CD-ROM and DVD-ROM disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

ADDITIONAL NOTES AND EXAMPLES

In Example 1, a method for generating a requirements statement model can include extracting, from a requirements document, a requirement statement, tagging each word of the requirements statement with a corresponding part of speech tag, identifying dependencies between words and types of dependencies between each word of the requirements statement and associating types of dependencies with each word, generating respective meta-tags for each word of the requirements statement based on the part of speech tag and dependencies, each meta-tag including the parts of speech and type of dependency for each word, identifying, based on the meta-tags and the dependencies, a tree of trees that represent the structure of the requirements statement, and populating the requirements statement model that maps to the identified tree with words of the requirements statement.

In Example 2, Example 1 can further include generating a system model based on models of the requirements statement and determining whether the requirements document has any ambiguities or inconsistencies based on the system model.

In Example 3, at least one of Examples 1-2 can further include, wherein the requirements document defines specifications of a product or service.

In Example 4, at least one of Examples 1-3 can further include, wherein the requirements statement includes a subject, object, imperative, and constraint.

In Example 5, at least one of Examples 1-4 can further include, wherein the trees are a finite number of trees that detail all possible structures of requirements document statements.

In Example 6, at least one of Examples 1-5 can further include identifying a word that is a root of the requirement statement, wherein the word is a root node of the tree for the requirement statement.

In Example 7, at least one of Examples 1-6 can further include identifying, by a regular expression, a precondition in the requirement statement.

Example 8 includes a non-transitory machine-readable medium including instructions that, when executed by a machine, cause the machine to perform operations for generating a requirements statement model, the operations comprising the method of one of Examples 1-7.

Example 9 includes a system comprising processing circuitry, and memory including instructions that, when executed by the processing circuitry, cause the processing circuitry to perform operations for generating a requirements statement model, the operations comprising the method of one of Example 1-7.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have ben illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instance or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for translating plain text into a requirements statement model expressed in a system architecture modeling language, the method comprising:

extracting, from a requirements document, a requirements statement;

tagging each word of the requirements statement with a corresponding, respective part of speech tags;

identifying dependencies between words and types of dependencies between each word of the requirements statement and associating types of dependencies with each word;

identifying and populating, based on the part of speech tags and the dependencies, a tree of trees that represent a structure of the requirements statement resulting in a populated tree;

generating respective meta-tags for each word of the requirements statement based on the populated tree and by combining compound expressions and inferring a role of the word in the requirements statement by its own part of speech word and co-existence with other part of speech tags in the populated tree, each meta-tag expressing the part of speech and type of dependency for a given word of the requirements statement;

identifying at least one of an entity, behavior, attribute, or constraint of the requirements statement;

determining, against a domain ontology or a customizable rule, a missing entity, behavior, attribute, or constraint;

notifying, based on the determination, a user of the missing entity, behavior, attribute, or constraint; and producing, using the meta-tags and the populated tree, the requirements statement model expressed in the system architecture modeling language.

2. The method of claim 1, further comprising generating a system model based on models of the requirements statement and determining whether the requirements document has any ambiguities or inconsistencies based on the system model.

3. The method of claim 1, wherein the requirements document defines specifications of a product or service.

4. The method of claim 1, wherein the requirements statement includes a subject, object, imperative, and constraint.

5. The method of claim 1, wherein the trees are a finite number of trees that detail all possible structures of requirements document statements.

6. The method of claim 1, further comprising identifying a word that is a root of the requirements statement, wherein the word is a root node of the tree for the requirements statement.

7. The method of claim 1, further comprising identifying, by a regular expression, a precondition in the requirements statement.

8. A non-transitory machine-readable medium including instructions that, when executed by a machine, cause the machine to perform operations for translating plain text into a requirements statement model expressed in a system architecture modeling language, the operations comprising:

extracting, from a requirements document, a requirements statement;

tagging each word of the requirements statement with a corresponding, respective part of speech tags;

identifying dependencies between words and types of dependencies between each word of the requirements statement and associating types of dependencies with each word;

identifying and populating, based on the part of speech tags and the dependencies, a tree of trees that represent a structure of the requirements statement resulting in a populated tree;

generating respective meta-tags for each word of the requirements statement based on the populated tree and by combining compound expressions and inferring a role of the word in the requirements statement by its own part of speech word and co-existence with other part of speech tags in the populated tree, each meta-tag expressing the part of speech and type of dependency for a given word of the requirements statement;

identifying at least one of an entity, behavior, attribute, or constraint of the requirements statement;

determining, against a domain ontology or a customizable rule, a missing entity, behavior, attribute, or constraint;

notifying, based on the determination, a user of the missing entity, behavior, attribute, or constraint; and producing, using the meta-tags and the populated tree, the requirements statement model expressed in the system architecture modeling language.

9. The non-transitory machine-readable medium of claim 8, wherein the operations further comprise generating a system model based on models of the requirements statement and determining whether the requirements document has any ambiguities or inconsistencies based on the system model.

10. The non-transitory machine-readable medium of claim 8, wherein the requirements document defines specifications of a product or service.

11. The non-transitory machine-readable medium of claim 8, wherein the requirements statement includes a subject, object, imperative, and constraint.

12. The non-transitory machine-readable medium of claim 8, wherein the trees are a finite number of trees that detail all possible structures of requirements document statements.

13. The non-transitory machine-readable medium of claim 8, wherein the operations further comprise identifying a word that is a root of the requirements statement, wherein the word is a root node of the tree for the requirements statement.

14. The non-transitory machine-readable medium of claim 8, wherein the operations further comprise identifying, by a regular expression, a precondition in the requirements statement.

15. A system comprising:

processing circuitry; and memory including instructions that, when executed by the processing circuitry, cause the processing circuitry to perform operations translating plain text into a requirements statement model expressed in a system architecture modeling language, the operations comprising:

extracting, from a requirements document, a requirements statement;

tagging each word of the requirements statement with a corresponding, respective part of speech tags;

identifying dependencies between words and types of dependencies between each word of the requirements statement and associating types of dependencies with each word;

identifying and populating, based on the part of speech tags and the dependencies, a tree of trees that represent a structure of the requirements statement resulting in a populated tree;

generating respective meta-tags for each word of the requirements statement based on the populated tree and by combining compound expressions and inferring a role of the word in the requirements statement by its own part of speech word and co-existence with other part of speech tags in the populated tree, each meta-tag expressing the part of speech and type of dependency for a given word of the requirements statement;

identifying at least one of an entity, behavior, attribute, or constraint of the requirements statement;

determining, against a domain ontology or a customizable rule, a missing entity, behavior, attribute, or constraint;

notifying, based on the determination, a user of the missing entity, behavior, attribute, or constraint; and producing, using the meta-tags and the populated tree, the requirements statement model expressed in the system architecture modeling language.

16. The system of claim 15, wherein the operations further comprise generating a system model based on models of the requirements statement and determining whether the requirements document has any ambiguities or inconsistencies based on the system model.

17. The system of claim 15, wherein the requirements document defines specifications of a product or service.

18. The system of claim 15, wherein the requirements statement includes a subject, object, imperative, and constraint.

19. The system of claim 15, wherein the trees are a finite number of trees that detail all possible structures of requirements document statements.

20. The system of claim 15, wherein the operations further comprise identifying a word that is a root of the requirements statement, wherein the word is a root node of the tree for the requirements statement.

* * * * *